April 28, 1970  R. S. ELLIOTT  3,509,269
THERMAL BARRIERS FOR CABLES
Filed June 11, 1968
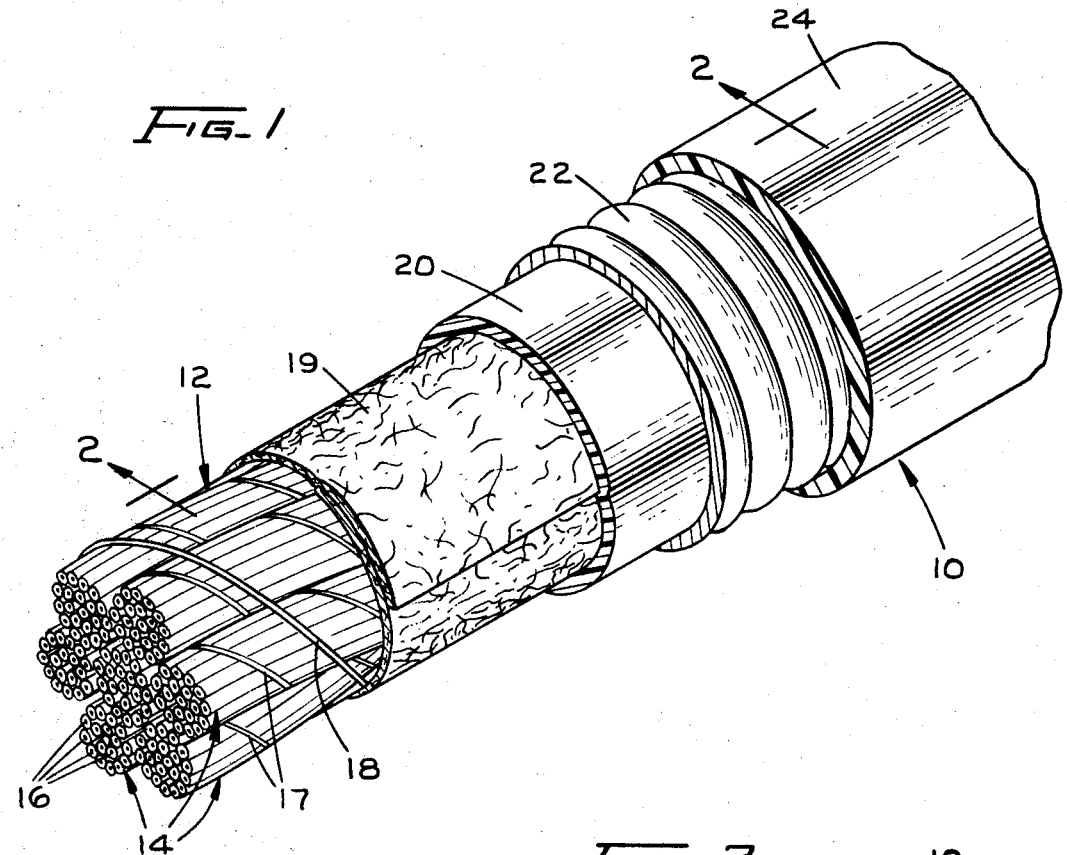
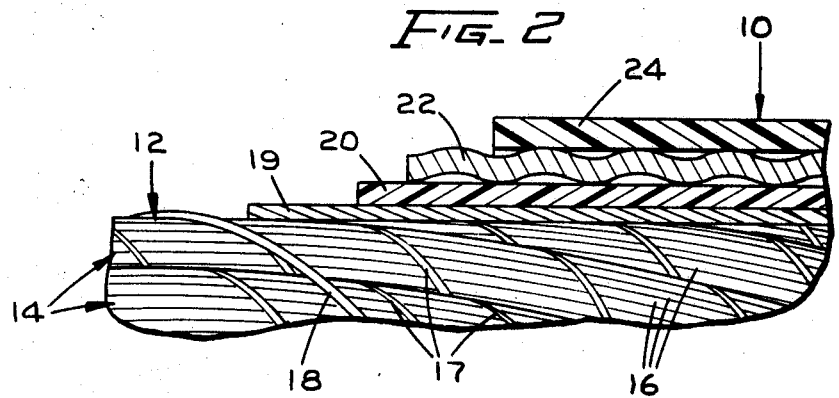
INVENTOR
R. S. ELLIOTT
BY  Don P. Bush
ATTORNEY 3,509,269
THERMAL BARRIERS FOR CABLES
Ray S. Elliott, Baltimore, Md., assignor to Western Electric Company, Incorporated, New York, N.Y., a corporation of New York
Filed June 11, 1968, Ser. No. 736,083
Int. Cl. H01b 7/02, 3/48
U.S. Cl. 174—120                                        10 Claims

ABSTRACT OF THE DISCLOSURE

A communication cable is covered with a sheath which has an one of its components a dielectric plastic jacket applied over a core of insulated conductors wherein there is no metallic shield interposed between the dielectric plastic jacket and the core of insulated conductors. The dielectric plastic jacket is formed of an extruded tube of polyethylene which melts at substantially the same temperature as the insulation on the conductors within the core, and plastic identification tapes which are used to hold groups of the conductors together. In order to prevent melting or undesirable deformation of the insulation on the conductors or the identification tapes as a result of heat of extrusion of the plastic jacket, a thermal barrier is provided between the core and the dielectric plastic jacket which is extruded thereover. The thermal barrier need not possess any significant dielectric strength, but should be nonhygroscopic, to prevent a need for drying of the cable during manufacture thereof; must be relatively inexpensive and must possess good thermal insulating properties. A material which has been found to fit all of these necessary requirements is a matted web formed of polyethylene terephthalate filaments which are randomly arranged and which are bonded primarily at the filamentary crossovers.

BACKGROUND OF THE INVENTION

Field of the invention

The invention relates to cables in which matted fibrous webs are used as thermal insulation betwene cores of insulated conductors and plastic jackets extruded over the cores.

Description of the prior art

Communications cables, which are designed primarily for use in direct-ground-burial applications, are very often covered with sheaths having extruded, inner, dielectric plastic jackets, metallic shields covering the inner dielectric jackets and outer, abrasion-resistant jackets extruded over the metallic shields. These cables also usually include cores of insulated conductors and thermal-barrier wrappings of sheet material surrounding the cores, over which the dielectic plastic jackets are extruded. Examples of such cables are those known in the industry as PAP-type and PASP-type cables, which are acronyms for polyethylene-aluminum-polyethylene sheathed cables and polyethylene-aluminum-steel-polyethylene sheathed cables, respectively.

PAP or PASP sheaths are intended primarily for use in geographic locations where a high likelihood of lightning exists. In the event that lightning or some accidental mechanical punctures of the outer jackets occurs, the inner dielectric jackets will prevent water from running into the cores. The inner jackets also provide substantially dielectric protection against high voltage breakdowns developing between the conductors and the metallic shields.

In a paper entitled "A New Cable Wrap with Improved Thermal Barrier Properties," presented to the Sixteenth Annual Wire and Cable Symposium, 1967 by Messrs. J. M. Casey and T. J. Grail, a disclosure was made of the use of a lamination of a strip polypropylene and a web of randomly-arranged, continuous-filament polyester fibers which are bonded primarily at the filament crossovers as thermal and dielectric insulation-wrapping material for cores of cables.

However, there was no disclosure in the paper of a use of a web of randomly-arranged, relatively-nonhygroscopic fibers as a core-wrapping material without the incorporation of the electrically insulative strength member in the form of the strip of polypropylene tape into a laminated structure. Perhaps there were various reasons or combination of reasons for not suggesting this, such as a thought that structural and dielectric strength of the strip of polypropylene was needed during the application of the wrapping on the cable or was needed after the wrapping was in place on the cable.

Other wrappings formed of webs of randomly-arranged fibers have been used on cables, but these webs have been formed of hygroscopic fibers, such as cellulose in the case of conventional core-wrapping paper.

Hygroscopic materials are undesirable in cables because hygroscopic materials will carry moisture into the cables during their manufacture and require a drying operation during the manufacture of the cable. Hygroscopic material will also tend to collect moisture, which might enter a cable by a diffusion process or through punctures in the sheath. The presence of a relatively high level of moisture which can exist in the cable within a hygroscopic material will have an adverse effect on the conductance, capacitance and other electrical properties of the conductors which are in contact with the hygroscopic materials. Such a change in electrical properties of the outer conductors without a corresponding change in electrical properties of the inner conductors which are not in contact with the hygroscopic material causes an electrical unbalance within the cable and a consequent degradation in the ability of the cable to transmit intelligible electric signals.

If hygroscopic materials are used in cables, the cables must be subjected to a drying operation during the course of their manufacture. Such a drying operation is cumbersome and difficult to perform. Maintaining cables in a dry state after a drying operation also presents difficulties which are avoided by the use of nonhygroscopic materials.

Materials used as thermal-barrier wrappings which have a film structure as a component thereof, such as polypropylene film or rubber film, have a tendency to form into comparatively smooth tubular shapes over a core of a cable when the materials are applied longitudinally. This tubular shaping tends to develop over the portions of the core which project furthest from the center of the core, thus resulting in an overall increasing of peripheral distance around which a dielectric plastic jacket must be applied.

Prior art materials used as thermal-barrier wrapping which have a film structure as a component thereof also tend to be more dense than fibrous materials of equivalent thickness and then inclusion tends to add the overall weight of the cables on which they are used.

SUMMARY OF THE INVENTION

It is an object of the invention to provide cables with new and improved thermal-barrier wrappings over the cores thereof, which wrappings are nonhygroscopic and have good ability to prevent excessive heat transfer therethrough.

It is another object of the invention to provide cables with thermal-barrier wrappings over the cores thereof which will closely conform to the shape of the core and will thus provide a minimal increase in peripheral dimension, with respect to the core, over which a plastic jacket must be extruded.

It is a further object of the invention to provide cables with thermal-barrier wrappings which are light in weight and contribute relatively little to the overall weight of the cable.

It is a still further object of the invention to form the thermal-barrier wrappings of webs of randomly-arranged fibers.

A cable illustrating certain features of the invention may include a core of at least one insulated conductor; a thermal barrier being formed of at least one web of randomly-arranged, relatively-nonhygroscopic filaments surrounding said core and being in contact with the core, said barrier being supple and flaccid so that it conforms readily to the contour of the outer surface of the core with which the thermal barrier is in contact, and an extruded jacket surrounding said thermal barrier and being in contact therewith.

BRIEF DESCRIPTION OF THE DRAWING

Other objects and features of the present invention will be more readily understood from the following detailed description of specific embodiments thereof when read in conjunction with the accompanying drawing, in which:

FIG. 1 is a perspective view of a communication cable, embodying certain principles of the present invention, with various layers broken away and some of the layers exaggerated in thickness for purposes of clarity.

FIG. 2 is a partial sectional view of the cable of FIG. 1 which illustrates some elements of the cable in greater detail.

DETAILED DESCRIPTION

Referring to FIGS. 1 and 2, there is illustrated a cable, designated generally by the numeral 10, which includes a core, designated generally by the numeral 12. The core 12 includes a plurality of units, designated generally by the numerals 14—14, of twisted pairs of insulated conductors 16—16. Each of the units 14—14 is wrapped with a plastic identification tape 17, which is used to both hold the units together and help identify the units during manufacture of the cable 10 and when a craftsman is installing or performing a splicing operation on the cable in the field.

The units 14—14 are held together as the core 12 by a binder 18 formed of a material such as nylon strand. The core 12 is additionally covered with a thermal barrier 19 which, in turn, has an inner dielectric jacket 20, of such material as polyethylene, extruded directly thereover. In the embodiment which is illustrated, the thermal barrier 19 is applied longitudinally over the core 12 as a single layer, but application of the core wrap as a helical wrap or in multiple layers, although not illustrated, is within the scope of the invention. A metallic shield 22 surrounds the inner dielectric jacket 20 and an abrasion-resistant outer jacket 24 of polyethyelne covers the metallic shield. The jacket 24 may or may not be bonded to the metallic shield 22. The metallic shield 22 may be corrugated aluminum approximately 0.008 inch thick where substantial flexibility is required in the case of large diameter cables, or the metallic shield may be flat aluminum approximately 0.008 inch thick in the case of smaller diameter cables where a great deal of flexibility in the metallic shield is not required. Other metals, such as copper, also can be used satisfactorily as the metallic shield 22.

The conductors 16—16 are preferably insulated with an insulating-grade of low density, high-molecular-weight polyethylene which may suffer serious shape distortion at temperatures of approximately 230° F. when subjected to pressures which might be encountered within the cable 10, particularly where the conductors 16—16 cross over each other. Obviously, other insulating materials, such as polyvinyl chloride or nylon, could be used within the scope of the invention; but polyethylene, at the present time, possesses the most desirable balance of price and suitable dielectric properties so that its use as an insulating compound on this type of communication cable is preferred.

The identification tapes 17—17 may be formed of oriented polyethylene which may suffer serious shape distortion at temperatures of approximately 230° F. when subjected to the pressures existing in the cable 10 during an extrusion of the dielectric jacket 20 thereon. The identification tapes 17—17 may be also formed of oriented polypropylene which will tolerate temperatures of up to approximately 300° F. before suffering similar shape distortion.

The inner dielectric jacket 20 is preferably formed of low-density, high-molecular-weight polyethylene which is usually extruded at a temperature of approximately 410° F. to 450° F. No coloration or additional pigmentation is used in the inner dielectric jacket 20, so that the dielectric jacket may possess the maximum dielectric strength available for the particular thickness and resin formulation. Additionally, the usual additives are not required in the dielectric jacket 20 to provide the jacket with resistance to ultraviolet degradation because the jacket is not generally exposed to sunlight.

The dielectric jacket 20 may be any one of a number of other thermoplastic resins; but as is the case with the compound used for insulating the conductors 16—16, the current balance of available dielectric strength and economics dictate that low-density, high-molecular-weight polyethylene is the preferable material for the jacket.

The thermal barrier 19 is a web structure made up primarily of randomly-arranged fibers which are bonded primarily at the filament crossovers. Continuity of the fibers of the web, while not necessary to the invention, will provide the web with an increased tensile strength which may be desirable. The fibers may be formed of any plastic resin, or other appropriate material, which is substantially nonhygroscopic; has a capability of maintaining its shape in the presence of the temperatures encountered during the extrusion of the dielectric jacket 20 so that an ability to insulate thermally is maintained within the web structure and is compatible chemically with other materials in the cable 10. The insulating ability of most web structures of this sort is obtained from the fibers of the sheet being arranged so that air cells or pockets are formed, which cells or pockets are highly effective to reduce heat transfer across the sheet.

In preventing excessive heat transfer, the thermal barrier 19 must be sufficiently effective so that the temperature at the surface of the identification tapes 17—17 or conductors 16—16 does not exceed the temperature at which the plastic, which is used in either of these items, is distorted. A melting or distorting of the identification tapes 17—17 will jeopardize the ease with a craftsman will be albe to identify the desired conductor 16 in the cable 10 during an installation or splicing operation.

A melting or distorting of the plastic insulation on any of the conductors 16—16 may have serious adverse effects on their electrical characteristics, and thus the ability of the conductors to transmit intelligible signals and withstand high-voltage stressing might be jeopardized.

An example of a resin which is suitable to make fibers for the present application is polyethylene terephthalate.

A polyethylene terephthalate fiber product, formed into a sheet structure as described above, is marketed under the tradename "Reemay" by the E. I. du Pont de Nemours and Company, Incorporated of Wilmington, Del. "Reemay" is available in various thicknesses and densities; and other similar products are available from other manufactures such as Hollingsworth and Vose Company, East Walpole, Mass., or Fiber Products Division of the Kendall Company, Walpole, Mass. This type of material is provided with various amounts of binders, such as acrylic resin, for holding the filaments of polyethylene terephthalate together.

Communication cables are manufactured in various sizes and with various numbers of the insulated conductors 16—16 making up the core 12. The thickness of the dielectric jacket 20 is not the same for all sizes of the cable 10, but rather the thickness varies proportionately with increasing diameter of the core 12. As the thickness of the dielectric jacket 20 increases, the amount of heat contained within the jacket as it is extruded over the core 12 also increases. With an increasing amount of heat available for transfer into the insulated conductors 16—16, it becomes necessary to provide the thermal barrier 19 with greater ability to insulate against heat transfer.

It has been determined that the cable 10, of the design shown in FIGS. 1 and 2, can be insulated satisfactorily with such materials as "Reemay" that is marketed under a code designation of 2017 or 2024 where the dielectric jacket 20 is high-molecular-weight, low-density polyethylene and is less than .071 inch thick. An example of a cable, like the cable 10 wherein the thickness of the jacket 20 is less than 0.71 inch, is one which includes 400 of the conductors 16—16 formed into pairs and each of the conductors is 19 AWG copper with a diameter over the insulation thereof of 0.060 inch, the insulation being high-molecular-weight, low-density polyethylene. The core 12 in the above case is approximately 1.69 inches in diameter.

Even though satisfactory insulation can be provided by codes 2017 and 2024 of "Reemay" for cable, such as the cable 10, having a diameter over the core 20 thereof up to 1.93 inches, it has been found preferable to limit the use of codes 2017 and 2024 of "Reemay" to cable, such as the cable 10, having a diameter over the cores thereof of less than 0.66 inch because it becomes difficult to form codes 2017 or 2024 of "Reemay" about the cores which are of a diameter larger than 0.66 inch.

For cable, such as the cable 10, having a diameter over the core 12 thereof equal to or greater than 0.66 inch, "Reemay" that is marketed under a code designation of 2222 can be used successfully. An example of a cable, like the cable 10, in the size range of over 0.66 inch diameter over the core 12 thereof is one formed of 150 of the conductors 16—16 formed into pairs, wherein each of the conductors is 22 AWG copper and the diameter over the insulation of each of the conductors is 0.043 inch.

"Reemay" marketed under code designation 2017 has a density of 0.116 ounce per cubic inch, has a thickness of 0.010 inch and is formed of substantially "straight" polyethylene terephthalate fibers. "Reemay" having a code designation of 2024 has a density of 0.141 ounce per cubic inch, has a thickness of 0.012 inch and is formed of substantially "straight" polyethylene terephthalate fibers. "Reemay" having a code designation of 2222 has a density of 0.100 ounce per cubic inch, has a thickness of 0.017 inch and is formed of crimped polyethylene terephthalate fibers. These codes are further defined and described in Bulletin NP-38, dated August 1967, entitled "Properties of 'Reemay' Spunbonded Polyester" from E. I. du Pont de Nemours and Company, Incorporated, Wilmington, Del.

Obviously, various other grades and thicknesses of "Reemay" or other similar materials may be used to insulate the cable cores 12—12 properly during their manufacture. Material densities of up to 0.25 ounce per cubic inch are practical values. Practical material thickness may range from 0.006 inch to 0.030 inch thick. These values by no means limit the invention but represent the present preferable ranges.

Another important characteristic of the thermal barrier 19 is the stiffness of body of the material which makes up the thermal barrier. Within limits, as the material for the thermal barrier 19 is made increasingly stiffer, it becomes increasingly easier to form the material longitudinally about the cable core 12, without wrinkling. However, it is important that the material is supple and flaccid enough to conform readily to the contour of the outer surface of the core 12 so that a minimal peripheral dimension is thus presented over which the inner dielectric jacket 20 must be applied. As a desirable consequence, a minimum overall diameter is achieved for the cable 10 which will meet all of the necessary transmission requirements.

Stiffness of the material for the thermal barrier 19 is controlled by a combination of factors such as the number of fibers per unit volume, thickness of the material, size of the fibers and amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least three factors, formability of the thermal barrier 19, cost of the thermal barrier and insulative capability of the thermal barrier, must be considered and balanced in choosing the proper material for use on a particular cable.

It is to be understood that the above-described arrangements are simply illustrative of the principles of the invention. Other arrangements may be devised by those skilled in the art which will embody the principles of the invention and fall within the spirit and scope thereof.

What is claimed is:
1. A cable which comprises:
   a core of at least one insulated conductor;
   a thermal barrier being formed of at least one web of randomly-arranged, relatively-nonhygroscopic filaments surrounding said core and being in contact with the core;
   said barrier being supple and flaccid so that it conforms readily to the contour of the outer surface of the core with which the thermal barrier is in contact; and
   an extruded jacket surrounding said thermal barrier and being in contact therewith.
2. The cable of claim 1, wherein the filaments of the thermal barrier are bonded together.
3. The cable of claim 1, wherein the filaments of the thermal barrier are primarily polyethylene terephthalate.
4. The cable of claim 1, wherein the density of the thermal barrier is less than 0.25 ounce per cubic inch.
5. The cable of claim 1, wherein the extruded jacket is polyethylene.
6. The cable of claim 3, wherein the thermal barrier is formed of substantially straight filaments.
7. The cable of claim 3, wherein the thermal barrier is formed of crimped filaments.
8. The cable of claim 4, wherein the thermal barrier has a thickness greater than 0.006 inch and less than 0.030 inch.
9. The cable of claim 4, wherein the thermal barrier includes a binder intermingled with the filaments.
10. A cable which comprises:
    a core of at least one insulated conductor;
    a thermal barrier formed of at least one web of relatively-nonhygroscopic filaments bonded together surrounding said core and being in contact with the core;
    said barrier being supple and flaccid so that it conforms readily to the contour of the outer surface of the core with which the thermal barrier is in contact; and an extruded jacket surrounding said thermal barrier and being in contact therewith.

References Cited

UNITED STATES PATENTS

| | | | |
|---|---|---|---|
| 3,304,214 | 6/1963 | Alm | 174—110 X |
| 3,459,871 | 8/1969 | Eager et al. | 174—25 |
| 3,344,228 | 9/1967 | Woodland et al. | 174—107 |
| 2,905,585 | 9/1959 | Hubbard et al. | 162—157 |
| 3,420,720 | 1/1969 | Hillman | 156—53 |
| 3,223,581 | 12/1965 | Sommer et al. | 162—157 |
| 3,376,378 | 4/1968 | Bullock | 174—107 |

OTHER REFERENCES

Grail, T. J., and Casey, J. M.: "A New Cable Wrap with Improved Thermal Barrier Properties," 16th Annual Wire and Cable Symposium, 1967.

Nomex Nylon Bulletin N–195, September 1965.

LEWIS H. MYERS, Primary Examiner

A. T. GRIMLEY, Assistant Examiner

U.S. Cl. X.R.

156—53, 56; 162—138; 174—102, 107, 110